United States Patent
Zillmer et al.

(10) Patent No.: US 7,278,392 B2
(45) Date of Patent: Oct. 9, 2007

(54) METHOD FOR OPERATING A HYBRID VEHICLE AND HYBRID VEHICLE WITH A MULTI-CYLINDER INTERNAL COMBUSTION ENGINE COUPLED TO AN ELECTRIC MOTOR

(75) Inventors: Michael Zillmer, Sickte (DE); Ekkehard Pott, Gifhorn (DE); Matthias Holz, Lehre (DE)

(73) Assignee: Volkswagen AG, Wolfsburg (DE)

( * ) Notice: Subject to any disclaimer, the term of this patent is extended or adjusted under 35 U.S.C. 154(b) by 10 days.

(21) Appl. No.: 11/326,838

(22) Filed: Jan. 6, 2006

(65) Prior Publication Data

US 2006/0169245 A1 Aug. 3, 2006

(30) Foreign Application Priority Data

Jan. 7, 2005 (DE) .................. 10 2005 001 046

(51) Int. Cl.
*F02B 3/00* (2006.01)
*F02B 3/04* (2006.01)

(52) U.S. Cl. .................. 123/299; 123/198 F; 180/65.2

(58) Field of Classification Search ................ 123/299, 123/198 F, 481, 198 DC, 198 DB, 350, 329, 123/339.16; 180/65.2, 65.3
See application file for complete search history.

(56) References Cited

U.S. PATENT DOCUMENTS

| 5,337,720 | A | 8/1994 | Murakami et al. .......... 123/481 |
| 5,803,040 | A | 9/1998 | Biesinger et al. ........... 123/198 |
| 6,748,916 | B2 | 6/2004 | Schaefer-Siebert .......... 123/198 |
| 7,025,033 | B2* | 4/2006 | Foelsche .............. 123/198 DB |
| 2003/0145808 | A1 | 8/2003 | Foelsche ...................... 123/44 |
| 2003/0160455 | A1* | 8/2003 | Hu et al. .................. 290/40 C |
| 2005/0205049 | A1* | 9/2005 | Lewis ................. 123/198 DB |

FOREIGN PATENT DOCUMENTS

| DE | 33 16 446 A1 | 11/1983 |
| DE | 42 92 543 C1 | 2/1997 |
| DE | 195 46 549 C1 | 3/1997 |
| DE | 100 06 743 A1 | 10/2000 |
| DE | 102 04 129 A1 | 8/2003 |
| EP | 1 298 300 A2 | 4/2003 |
| GB | 2 119 853 A | 5/1983 |

\* cited by examiner

*Primary Examiner*—Mahmoud Gimie
(74) *Attorney, Agent, or Firm*—Baker Botts L.L.P.

(57) ABSTRACT

In a method for operating a hybrid vehicle with a combustion engine coupled to an electric motor having at least one inlet and one outlet valve per cylinder, a variable valve control, and a fuel injection device, with a first partial power, from the overall drive power provided to the vehicle, it is provided that upon request a cylinder that can be switched off is deactivated and filled with fresh gas, and upon request for activating the cylinder in the temporally next suction and/or compression phase of the cylinder a predetermined amount of fuel and an ignition of the mixture occurs by no later than the end of the compression phase and/or that in order to adjust the momentum during the activation of a cylinder that had been switched off a multiple injection of fuel occurs, preferably a dual injection, in a homogenous split mode of operation.

19 Claims, 2 Drawing Sheets

METHOD FOR OPERATING A HYBRID VEHICLE AND HYBRID VEHICLE WITH A MULTI-CYLINDER INTERNAL COMBUSTION ENGINE COUPLED TO AN ELECTRIC MOTOR

PRIORITY

This application claims priority from German Patent Application No. DE 10 2005 001 046.6, which was filed on Jan. 7, 2005, and is incorporated herein by reference in its entirety.

TECHNICAL FIELD

The invention relates to a method for operating a hybrid vehicle and a hybrid vehicle.

BACKGROUND

In hybrid vehicles two or more drive units are combined with one another, which, in different manners, provide the power required for operating the vehicle. Due to the fact that the features of an internal combustion engine and an electric motor complement one another in a particularly beneficial manner, presently common hybrid vehicles are mostly provided with a combination of an internal combustion engine and an electric motor. The operation of the vehicle via the electric motor occurs primarily in the range of small loads, because the internal combustion engine provides considerably lower levels of effectiveness under partial load than under full load. Under higher loads the operation occurs preferably via the internal combustion engine, because then the electric energy accumulator, from which the electric motor is supplied during operation, can be recharged with relatively good effectiveness by an additional generating operation of the electric motor. Furthermore, in order to increase the maximum torque provided for the vehicle, the release of momentum by the internal combustion engine and the electric motor can additionally occur parallel.

In multi-cylinder internal combustion engines, higher overall effectiveness can be achieved by switching off some cylinders, because the remaining cylinders can be operated with higher effectiveness. A hybrid drive with a thermal engine is known from DE 100 06 743 A1, for example, which is provided with the possibility to switch off cylinders in order to avoid any operation under partial load.

A purely electric drive using the electric motor is only useful in combination with a conventional internal combustion engine when the internal combustion engine and the electric motor can be uncoupled mechanically. Otherwise, the drag momentum to be provided for the internal combustion engine switched off leads to a large portion of the electric energy having to be provided for this purpose. In particular, in the lower load range only very low overall effectiveness can be achieved in such a mode of operation. A mechanical uncoupling of the internal combustion engine from the electric motor, for example by an additional clutch, involves an increased construction expense and, thus, considerably increased costs. Furthermore, high expenses result for an adjustment of the overall system for the purpose of comfort, because the uncoupling and, in particular, the coupling of the internal combustion engine to the electric motor, even in dynamic drive situations, must be performed to the extent possible without any leaps in momentum and/or any vehicle jerks resulting therefrom. An alternative for a mechanical uncoupling is the reduction of the drag momentum by way of deactivating a valve operation of cylinders that are switched off.

In addition to concepts, in which merely the fuel supply for the cylinders that are switched off is interrupted, it is known to switch them off by controlling the inlet and outlet valves. For example, from DE 102 04 129 a hybrid vehicle is known, in which, for the purpose of switching off the internal combustion engine causing little vibrations, in addition to reducing the fuel supply, the release of condensing means is initiated, in particular in a piston. The release of the condensing means can be achieved by opening a throttle, shortening a compression phase, shortening the time, at which both the inlet and the outlet valves are simultaneously closed, a permanent opening of the inlet and outlet valves or the like. Additionally, one or more cylinders of the internal combustion engine can be switched off mechanically. This can be achieved such that a cylinder control addresses the inlet and outlet valve, either directly or indirectly or via a control for the camshaft such, that the outlet and the inlet valve of the combustion chamber are permanently opened or closed when the internal combustion engine is switched off.

From DE 42 92 543 C1 a motor control method has been known for a suction pipe injection engine, in which immediately prior deactivation air only is suctioned into the cylinders that can be switched off and thus it is prevented that exhaust can be enclosed in the cylinders. When actuating a cylinder previously switched off the valve drives, which are allocated to the cylinders switched off, are released from the interruption of the valve operation, i.e. are reactivated. Further, by means of a detection device it is determined if or if not the motor is operating in a core range for rapid acceleration. If the motor is operating in a core range for rapid acceleration, a preliminary, i.e. preparatory fuel injection occurs in the cylinders that can be switched off. In normal conditions, the fuel injection is initiated after the valve operation has begun, i.e. after air only had been suctioned into the cylinders that can be switched off. Based on the effects of films forming on the wall of the manifold passage during indirect fuel injection, an additional amount of fuel mass, which is hard to determine, is located in the cylinder that previously had been switched off, leading to a high level of inaccuracy in the admeasurement of the correct fuel amount for the requested targeted air ratio at activation. Additionally, a small amount of fuel and oil will reach the cylinder combustion chamber via blow-by, depending on the duration of the switch off-phase, and thus leading to an additional modification of the composition of the mixture.

Further, from DE 195 46 549 C1 it is known to add a cylinder after the suction cycle and prior to the outlet cycle. In order to avoid an undesired cooling of the combustion chamber it is suggested to keep the hot exhaust gas in the cylinders switched off during the switch off-phase.

In order to prevent an undesired momentum jerk during the deactivation and/or activation of cylinders, in EP 1 298 300 A2 it is suggested, prior to deactivation, to reduce the power of the cylinders to be switched off during partial motor operation and simultaneously to increase the power of the cylinders that continue operating. When the cylinders are reactivated their power is increased, while the power of the cylinders that continue to operate is reduced or maintained constant. Due to the fact that loss of gas can occur by leaks in a cylinder that has been switched off, it is suggested in DE 33 16 446 A1 to briefly open the inlet valve even in cylinders that have been switched off.

SUMMARY

The object of the present invention is to provide a method of a generic type for operating a hybrid vehicle, by which the adjustment of the momentum can be realized with great accuracy when a cylinder that had been switched off is reactivated. Furthermore, a hybrid vehicle is to be provided embodying said method.

According to the invention the object can be achieved by a method for operating a hybrid vehicle with a multi-cylinder internal combustion engine coupled to an electric motor comprising at least one inlet and at least one outlet valve per cylinder, a variable valve control, and a fuel injection device for directly injecting fuel into the cylinders, with the overall driving power provided to the vehicle being provided in a first partial power by the internal combustion engine and a second partial power by an electric motor, the method comprising the steps of: upon the request for deactivating a cylinder that can be switched off, filling the cylinder with fresh gas and, upon request, to activate the cylinder, injecting a predetermined amount of fuel and igniting a mixture of the fuel and fresh gas in the temporally next suction or compression phase of the cylinder by no later than the end of the compression phase and/or, for adjusting the momentum at the activation of a cylinder that was switched off, injecting of fuel multiple times in a homogenous split mode of operation.

The step of injecting multiple times may preferably comprise a dual injection. At least one, preferably all cylinders of the internal combustion engine can be switched off at a predetermined partial load. The internal combustion engine can be deactivated below a predetermined rotation, preferably below an idling rotation, of the internal combustion engine. Subsequent to an interval, in which one or several cylinders are switched off, an activation of one or several cylinders may occur, if an overall drive power or load requested of the internal combustion engine and/or a rotation of the internal combustion engine is higher than the respectively predetermined levels. The internal combustion engine can be switched off in a stop-and-go operation. In order to activate and/or deactivate one or several cylinders a deactivation and/or activation of at least one selected gas exchange valve may occur. After a prior deactivation of a cylinder a temporally delayed activation of a selected gas exchange valve may occur when the cylinder is activated. Prior to the end of an expansion phase following a compression phase, a previously deactivated outlet valve can be activated and, after the activation of the outlet valve, preferably no later than the beginning of the subsequent suction phase, a previously deactivated inlet valve can be activated. A determination of the amount of fresh air and/or mixture parameters present in a deactivated cylinder may occur in the switched off operational state and the determined amount of fresh air and/or the mixture parameters can be used for determining the fuel amount to be injected into the cylinder. The first part of the fuel injection into the cylinder may occur by no later than the end of the suction phase and the latest fuel injection occurs during the compression phase. For adjusting the momentum at the activation of a cylinder that had been switched off an advance angle shift may occur late for one or more combustion cycles of the cylinder.

The object can also be achieved by a hybrid vehicle comprising a multi-cylinder internal combustion engine coupled to an electric motor having at least one partial power, from an overall drive power provided to the vehicle, provided by the internal combustion engine and a second partial power provided by the electric motor, a device for activating and deactivating a cylinder operable, upon the request for deactivating a cylinder that can be switched off, to cause the cylinder to be filled with fresh gas and, upon request of activating the cylinder, to cause an injection of a predetermined amount of fuel and to cause the ignition of the mixture in the temporal next suction and/or compression phase of the cylinder by no later than the end of the compression phase, and/or a device for adjusting the momentum operable to cause a multiple injection in a homogenous split mode of operation at the activation of a cylinder that was switched off.

The electric motor and the multi-cylinder internal combustion engine can be coupled to one another in a fixed manner. The electric motor and the multi-cylinder integral combustion engine can also be coupled to one another in a variable manner.

According to the invention a method of the generic type is further developed such that after deactivation of a cylinder that can be switched off upon the request to deactivate said cylinder, the cylinder is filled with fresh gas and, upon request to activate the cylinder, an injection of the predetermined amount of fuel and an ignition of the mixture occurs in the temporally next suction or compression phase of the cylinder by no later than the end of the compression phase and/or that for adjusting the momentum during the activation of a cylinder that had been switched off a multiple injection of fuel occurs, preferably a dual injection, in a homogenous split mode of operation.

The method according to the invention allows to activate a cylinder that had been previously switched off with the momentum provided matching the requirements. The filling of the cylinder with fresh air occurring during the suction phase, however without any injection of fuel, prevents any deposit of fuel at the cylinder walls and allows an adjustment of the correct fuel amount for the predetermined air ratio during activation of the cylinder. Further, by the precise adjustment of the fuel amount inserted into the reactivated cylinder positive effects are achieved with respect to fuel consumption, exhaust emissions, and the life of the catalytic converters arranged in the exhaust system of the internal combustion engine, if applicable.

An adjustment of the momentum according to the requirement during activation of a cylinder that had been switched off occurs according to the invention by a multiple injection of fuel in a homogenous split mode of operation. Here, a dual injection is preferred. In a multiple injection in a homogenous split mode of operation a first, early injection occurs during the suction cycle of the cylinder, with the injected amount of fuel at the time of ignition is provided with a largely homogenous spatial distribution in the combustion chamber of the cylinder. Additional, later injections of fuel are performed during the subsequent compression cycle, with the fuel injected being provided with a stratified charge in the combustion chamber. In a stratified charge the fuel amount injected is concentrated in an area, in which locally the introduction of the ignition energy into the cylinder occurs. The multiple injection allows a later ignition than in an operational mode with a single injection and, thus, a wider range of adjustment of the momentum.

In further embodiments of the invention at least one cylinder, preferably all cylinders of the internal combustion engine are switched off in a predetermined partial load range and/or below a predetermined rotation of the internal combustion engine, which allows to increase the effectiveness in a given overall drive power provided to the vehicle. Further, subsequent to a temporal interval, in which one or, if necessary, more cylinders are switched off, the activation of one or, if necessary, several cylinders can be implemented, when the requested overall drive power and/or a requested rotation is higher than the respectively predetermined values.

Particularly high efficiency can be achieved when the internal combustion engine is switched off in a stop and go—operation.

In order to deactivate and/or to activate one or, if necessary, several cylinders an activation and/or deactivation of at least one of the selected gas exchange valves occurs, by which the effectiveness can be increased considerably for a mode of operation, in which one or more cylinders of the internal combustion engines are switched off. It is useful if a temporally delayed activation of a valve operation and, optionally, a subsequent fuel injection and/or an ignition occurs at the activation of a cylinder subsequent to a previous deactivation of said cylinder, because this way an adjustment of the momentum, in particular a gradual increase in momentum of the internal combustion engine can be achieved.

According to another aspect of the invention, a determination of the amount of fresh air and/or mixing parameters provided in a cylinder that can be switched off in the deactivated mode of operation occurs, and the determined amount of fresh air and/or the mixture parameters are used for determining the fuel amount to be injected at the activation of said cylinder, which can achieve a more precise admeasurement of the fuel amount to be injected into the cylinder reactivated after it had been switched off.

Furthermore, in a preferred further development of the invention, a first part of the fuel injection into said cylinder is performed by no later than the end of the suction phase and the latest fuel injection during the compression phase, which can achieve, in particular for the purpose of adjusting the momentum, a later ignition time with still good ignition features of the injected fuel. It is preferred that, for the purpose of adjusting the momentum at the time of activation, an ignition angle adjustment is selected late for one or more combustion cycles of the cylinder. It is particularly beneficial for the first fuel injection to occur in the first half of the suction phase and for the fuel inserted in this injection to be distributed homogenously in the combustion chamber of the cylinder at the time of ignition. Further, it is beneficial for the last fuel injection to occur in the second half of the compression phase and that, at the time of the ignition, the fuel injected in this injection to be essentially concentrated in a spatial area, in which the ignition energy is introduced.

The invention is advantageously used in a hybrid vehicle of the generic type, which is provided with an arrangement for adjusting the momentum, by which an activation of a cylinder that had been switched off can be achieved in a multiple injection in a homogenous split mode of operation and/or an arrangement for activating or deactivating a cylinder is provided, by which a cylinder that can be switched off is filled with fresh gas upon the request to be switched off, and an injection of a predetermined amount of fuel and an ignition of the mixture occurs upon the request for activating the cylinder in the temporally next suction or compression phase of the cylinder by no later than the end of the compression phase.

A hybrid vehicle is particularly preferred, in which the electric motor and the multi-cylinder internal combustion engine are coupled to one another in a fixed manner, because in this case a lower constructive expense and reduced costs can be achieved in production, maintenance, and, if necessary, repair of the vehicle. However, the invention can also be used in a hybrid vehicle with a variably coupled electric motor and multi-cylinder combustion engine.

BRIEF DESCRIPTION OF THE DRAWINGS

Further advantages and aspects of the invention are shown in the claims using the drawing, independent from their abstract, in the following description of the exemplary embodiments.

It shows.

DETAILED DESCRIPTION

Figure 1:
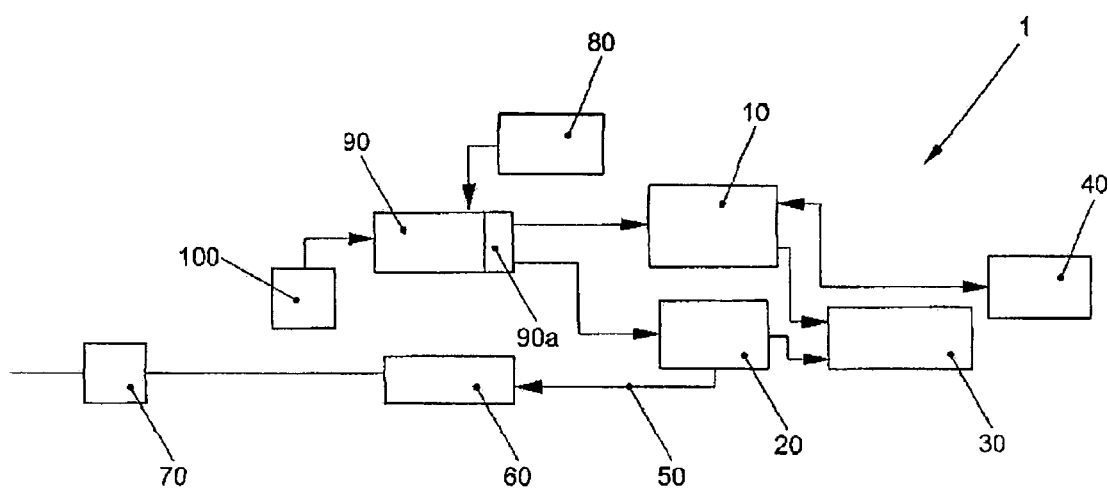
FIG. 1 a hybrid drive for a hybrid vehicle according to the invention

FIG. 1 shows in a schematic representation a hybrid drive 1 for a hybrid vehicle otherwise not shown. An electric motor and/or an electric engine 10 and a multi-cylinder internal combustion engine 20 are coupled to a transmission 30, which is coupled in a fixed or variable manner to at least one vehicle wheel, not shown in FIG. 1. For connecting the electric motor to the motor camshaft, various concepts are possible. Here, the preferred concepts are a direct connection to a motor camshaft or a connection via a belt drive, a transmission, or a clutch. In another embodiment of the invention the electric motor 10 and the multi-cylinder internal combustion engine 20 are mechanically coupled in a fixed manner. The electric motor 10 is electrically coupled to an electric energy storage device, for example a rechargeable battery or the like. An exhaust device 50 is allocated at the internal combustion engine 20 having a pre-catalytic converter 60 in the proximity of the engine and a primary catalytic converter 70 arranged downstream. A motor control device 90 receives control signals via control sensors 80, for example the drive pedal module or an automatic breaking system, as well as values of operational parameters of the hybrid vehicle via sensors 100, in particular of the electric motor 10, the internal combustion engine 20, the exhaust device 50, and additional vehicle components.

The internal combustion engine 20 is a fuel-injected gasoline engine with a variable valve control and/or valve operation. The valve operation can be embodied partially or entirely variable, mechanical, or electrical. Particularly preferred is a lean-running fuel-injected gasoline engine, because in the lower load/rotation ranges considerable savings in fuel consumption can be achieved in reference to conventional gasoline engines. In particular, in said embodiments of the invention it is useful for the pre-catalytic converter 60 to be a 3-way catalytic converter and the primary catalytic converter 70 to be a NOx-storage catalytic converter. For example, the pre-catalytic converter 60 serves for cleaning stochiometric exhaust, converting hydrocarbons (HC) into lean exhaust gas, and for improving the exhaust cleaning at cold start-ups. The NOx-storage catalytic converter 70 is preferably designed for storing nitrous oxide (NOx) in lean exhaust gas.

In a preferred embodiment, the control device 90 includes one or more microprocessors, data storage devices, and interfaces as well as an arrangement 90a for switching a cylinder on or off and/or for adjusting the momentum of a reactivated cylinder that had been switched off. Depending on the signals of sensors 80 the overall torque and/or partial momentums can be determined by a control unit 90, which are supplied by the electric motor 10 and the internal combustion engine 20, and which are at least partially provided by the transmission 30. The coupling between the electric motor 10 and the internal combustion engine 20 allows both a negative as well as a positive transmission of the torque between these two components.

The sensors 100, not shown in greater detail in FIG. 1, comprise sensors for measuring or determining operational parameters, preferably of the storage device 40, the electric motor 10, the internal combustion engine 20, and the exhaust device 50. In particular, lambda sensors can be arranged in the exhaust device 50 upstream of the pre-catalytic converter 60, downstream of the pre-catalytic converter 60, downstream of the primary catalytic converter 70, or upstream of the primary catalytic converter 70. Further, at various locations of the exhaust device NOx, SOx, or hydrocarbon sensors can be arranged.

From the overall drive power provided by a hybrid vehicle, a first partial power is provided by the internal combustion engine and a second partial power by the electric motor.

At least one cylinder, preferably all cylinders of an internal combustion engine, is switched off in a predetermined partial load range of the internal combustion engine or the overall drive momentum. Alternatively or additionally a deactivation of cylinders can occur below a predetermined rotation of the internal combustion engine.

According to one aspect of the invention, via a device 90a, upon request of deactivation, a cylinder to be switched off is filled with fresh gas (air) and upon the request of activating the cylinder, at the temporally next suction or compression phase of the cylinder by no later than the end of the compression phase, an injection of a predetermined amount of fuel occurs as well as the ignition of the mixture. Additionally or alternatively, for the purpose of adjusting the momentum when a cylinder that had been switched off is activated, a multiple injection of fuel is performed in a homogenous-split mode of operation. Preferably, dual injection is used as the multiple injection.

Figure 2:
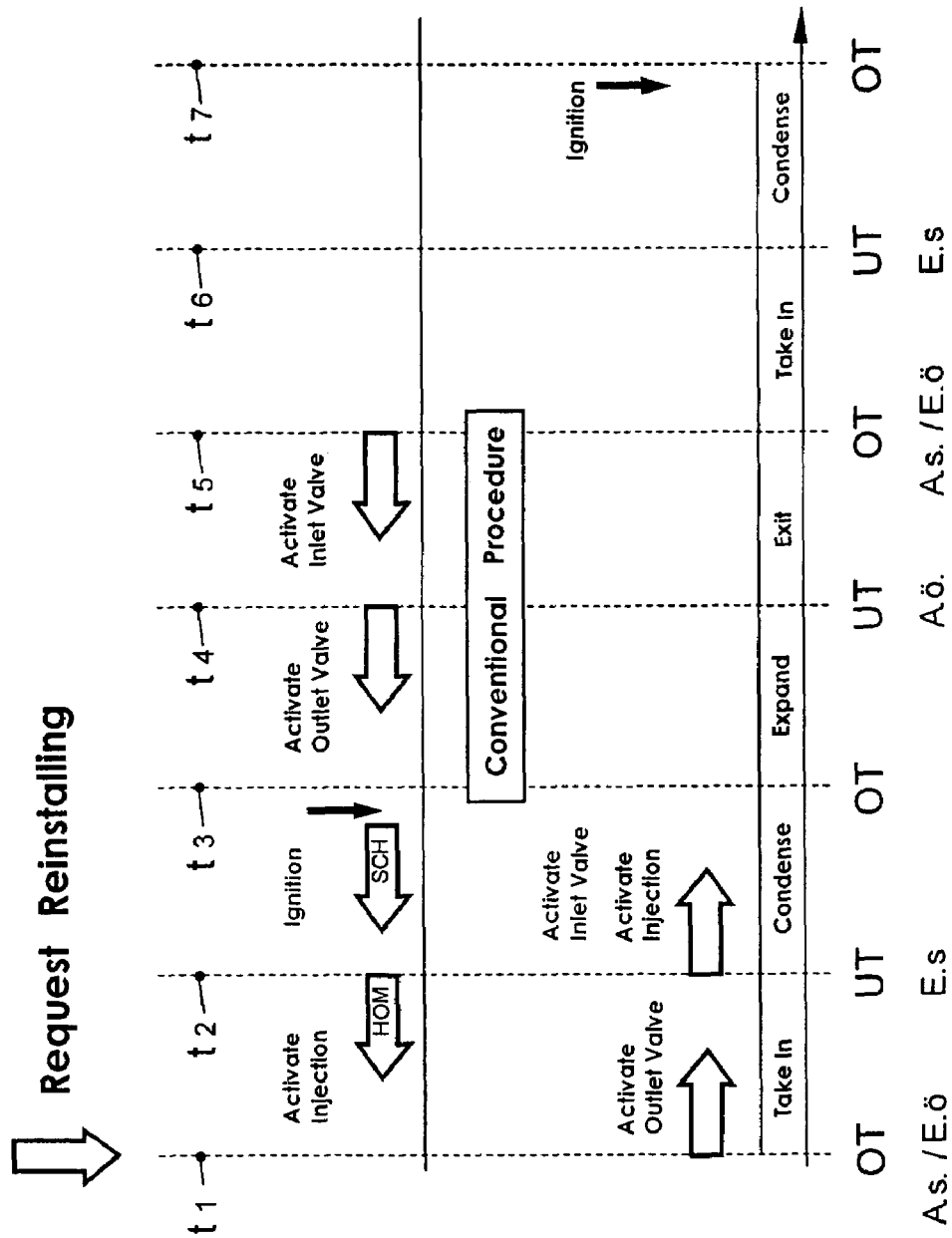
FIG. 2 a temporal progression during the activation of a cylinder that had been switched off

FIG. 2 shows a representation of the mode of operation of the method according to the invention upon the request to reactivate a cylinder that had been switched off in reference to a conventional method, each depending on the angle of the camshaft. From a time $t_1$ to a time $t_7$ a cycle of suction, compression, expansion, expulsion, suction, and compression phases of combustion cycles of the internal combustion engine is shown. In the lower part of FIG. 2, a mode of operation of a conventional method is shown, in which exhaust gas remains in the cylinder. OT and/or UT refer to the upper dead center and/or the lower dead center of the camshaft. A.s., A.ö. and/or E.s. and E.ö. refer to the closing (s) and/or opening (ö) of the outlet valve (A) and the inlet valve (E), respectively. In normal operation of the internal combustion engine, the identification A.s. and/or A.ö. and/or E.s. and E.ö. indicate the usual closing and/or opening times of the gas inlet valves. For the method according to the invention, the latest possible times for activating the gas exchange valves are shown in FIG. 2, as well as the injection and the ignition and, for the conventional method, the earliest possible times.

According to the invention, when reactivating a cylinder, being in a suction or compression phase in a deactivated state at a time $t_1$, i.e. in a temporal interval $t_3$-$t_1$, a predetermined amount of fuel is injected into said cylinder. In the subsequent expansion phase, i.e. at a temporal interval $t_4$-$t_3$, the outlet valve 17 is activated. An activation of the inlet valve 16 occurs no later than prior to the beginning of the next suction phase, i.e. the upper dead center OT of the camshaft during the change of charge.

Using the direct fuel injection according to the invention in a temporal interval $t_4$-$t_3$ a precise admeasurement of fuel in reference to the fresh air mass enclosed in the cylinder is possible. Further, the late injection operates so that no enduring contact of the injected fuel occurs to the walls of the internal combustion chamber. By appropriately selecting the opening and closing times of the outlet and/or the inlet valve and/or the angle of the ignition as well as the mode of operation a control of the momentum can also occur according to the invention.

In the conventional method shown in the lower part of FIG. 2, the outlet valve is deactivated when the cylinder is switched off prior to the end of the expansion phase and simultaneously or subsequently, prior to the next "open inlet" cycle, the inlet valve is deactivated. Therefore, an enclosed amount of residual pressurized gas from the cycle of the cylinder ignited last remains in the deactivated cylinder. By the increased pressure in the cylinder it can be avoided that blow-by gasses can enter from the camshaft housing. Upon request for activation, in conventional methods the outlet valves can be activated no earlier than at the time $t_1$ and the inlet valve as well as the injection no earlier than the time $t_2$. Prior to igniting the mixture at a reactivation of the cylinder, operational cycles for removing the residual amount of gas and for suctioning fresh amounts of gas are required so that a temporal delay at reactivation cannot be avoided. In the conventional method the ignition cannot occur prior to the temporal interval $t_7$-$t_6$.

It is understood that in the method according to the invention an overlap of valves is possible as well, i.e. a simultaneous activation of gas exchange valves.

In a preferred embodiment of the invention, during the deactivation of said cylinder the fuel injection is deactivated and said cylinder is filled with fresh gas in the switched off operational state. The activation of the ignition device of said cylinder occurs in a predetermined temporal delay after the activation of the fuel injection device and prior to the activation of the gas exchange valves considering the readiness time to be implemented for maintaining the ignition times, for example for ignition coils and the like.

Depending on the type of internal combustion engine and the modes of operation available the activation of the cylinders that are switched off can occur in different modes of operation. The time of activating the fuel injection as well as the injection into said cylinders is selected differently depending on the mode of operation when the cylinders are activated.

If the previously switched off cylinder is operated in a stratified charge mode of operation the fuel injection preferably occurs during the compression phase, in order to ensure a desired layering of compression in the combustion chamber of the cylinder. If necessary, the activation of the ignition device occurs at a suitable time during the suction and/or compression phase.

According to another aspect of the invention, in order to adjust the momentum during the activation of one or more cylinders that had been switched off, a multiple injection of fuel occurs in a homogenous split mode of operation. The multiple injection is preferably a dual injection. In the homogenous split mode of operation the first part of the injection is finished by the end of the suction phase and the latest injection, leading to a layered charge in the cylinder, is performed during the compression phase. Here, the first injection occurs preferably within the first half of the suction phase. The latest, preferably second injection, occurs preferably in the second half of the compression cycle. Preferably the first injection occurs with the trigger beginning in a range from 360° to 200° KW prior to ZOT and the second injection at the end of a trigger from 80° to 20° KW prior to ZOT. Here, the ignition angle is in a range from 40° KW prior to OT to 40° KW after OT, depending on the required momentum.

When deactivating the valve operation all or individual cylinders only can be switched off. It is understood that by deactivating all cylinders the greatest reduction of the drag momentum of the internal combustion engine is achieved.

A deactivation of the internal combustion engine is particularly advantageous when the hybrid vehicle is moved in the so-called stop-and-go mode. In this case, the vehicle frequently runs only a few meters and is then stopped again. Due to the fact that internal combustion engines, when standing still, are generally switched off for reasons of fuel consumption and the ignition process of the internal combustion engine leads to a significant increase in fuel consumption in reference to the distance driven, it is useful in the stop-and-go mode to drag the internal combustion engine during deactivation of the valve operation by way of the electric motor. Preferably, the hybrid vehicle is moved forward with a gear engaged. It is understood that the omission of frequent start-ups of and turn offs of the motor is also connected to an improvement of comfort. By deactivating the valve operation, for example by converting the stroke of the cams to 0 lift, the drag momentum of the internal combustion engine is reduced considerably, which is the result of the lesser force for operating valves as well as for avoiding loss of flow during suction and/or removal of cylinder fill.

Subsequent to a temporal interval, in which one or, if necessary, several cylinders are deactivated, an activation of one or more cylinders occurs if a requested overall drive power is higher than a predetermined level. Alternatively or additionally an activation occurs if a requested rotation is higher than a predetermined level. The level for the rotation is in a range from 2500 to 4500 1/min., preferably in a range from 3000 to 4000 1/min., particularly preferred at approximately 3500 1/min. for a stop-and-go operation the level is in a range from 1500 and 2500 1/min. If the driver requests a momentum M, which is greater than the maximum that can be provided by the electric motor, a transfer occurs to the motorized operation and/or an activation of one or more cylinders.

When the motor rotations and/or overall drive power is further increased, a successive transfer occurs from the electric drive to the drive by internal-combustion engine. When exceeding a predetermined level of the motor rotation and/or the overall drive power the drive occurs exclusively by the internal combustion engine. In order to cause no undesired vehicle accelerations a gradual increase of the torque of the internal combustion engine occurs. According to a preferred embodiment of the invention a gradual increase in torque is achieved by a temporarily delayed activation of the valve operation of the individual cylinders. Further, a temporally delayed activation of the injection and the ignition of the individual cylinders occur according to the delayed activation of the valve operation. In a gasoline engine, an adjustment of the momentum is achieved by an advance angle shift. It is understood that the individual measures can also be used parallel, partially, or in their entirety.

LIST OF NUMERALS 1 hybrid drive with a control system
10 electric motor
20 internal combustion engine
30 transmission
40 battery
50 exhaust device
60 pre-catalytic converter
70 primary catalytic converter
80 sensors
90 motor control device
90a device for activating and deactivating a cylinder and/or to adjust momentum
100 sensors

What is claimed is:

1. A method for operating a hybrid vehicle with a multi-cylinder internal combustion engine coupled to an electric motor comprising at least one inlet and at least one outlet valve per cylinder, a variable valve control, and a fuel injection device for directly injecting fuel into the cylinders, with the overall driving power provided to the vehicle being provided in a first partial power by the internal combustion engine and a second partial power by an electric motor, the method comprising the steps of:
   upon the request for deactivating a cylinder that can be switched off, filling said cylinder with fresh gas and,
   upon request, to activate the cylinder, injecting a predetermined amount of fuel and igniting a mixture of said fuel and fresh gas in the temporally next suction or compression phase of the cylinder by no later than the end of the compression phase wherein for adjusting the momentum at the activation of a cylinder that was switched off, injecting of fuel multiple times in a homogenous split mode of operation.

2. A method according to claim 1, wherein the step of injecting multiple times comprises a dual injection.

3. A method according to claim 1, wherein at least one cylinder of the internal combustion engine can be switched off at a predetermined partial load.

4. A method according to claim 1, wherein all cylinders of the internal combustion engine can be switched off at a predetermined partial load.

5. A method according to claim 1, wherein the internal combustion engine is deactivated below a predetermined rotation of the internal combustion engine.

6. A method according to claim 1, wherein the internal combustion engine is deactivated below an idling rotation of the internal combustion engine.

7. A method according to claim 1, wherein subsequent to an interval, in which one or several cylinders are switched off, an activation of one or several cylinders occurs, if an overall drive power or load requested of the internal combustion engine and/or a rotation of the internal combustion engine is higher than the respectively predetermined levels.

8. A method according to claim 1, wherein the internal combustion engine is switched off in a stop-and-go operation.

9. A method according to claim 1, wherein in order to activate and/or deactivate one or several cylinders a deactivation and/or activation of at least one selected gas exchange valve occurs.

10. A method according to claim 9, wherein after a prior deactivation of a cylinder a temporally delayed activation of a selected gas exchange valve occurs when said cylinder is activated.

11. A method according to claim 1, wherein prior to the end of an expansion phase following a compression phase, a previously deactivated outlet valve is activated and, after the activation of the outlet valve a previously deactivated inlet valve is activated.

12. A method according to claim 1, wherein prior to the end of an expansion phase following a compression phase, a previously deactivated outlet valve is activated and, after the activation of the outlet valve and no later than the beginning of the subsequent suction phase a previously deactivated inlet valve is activated.

13. A method according to claim 1, wherein a determination of the amount of fresh air and/or mixture parameters present in a deactivated cylinder occurs in the switched off operational state and wherein the determined amount of fresh air and/or said mixture parameters is used for determining the fuel amount to be injected into said cylinder.

14. A method according to claim 1, wherein the first part of the fuel injection into said cylinder occurs by no later than the end of the suction phase and the latest fuel injection occurs during the compression phase.

15. A method according to claim 1, wherein for adjusting the momentum at the activation of a cylinder that had been switched off an advance angle shift occurs late for one or more combustion cycles of the cylinder.

16. A hybrid vehicle comprising:
  a multi-cylinder internal combustion engine coupled to an electric motor having at least one partial power, from an overall drive power provided to the vehicle, provided by the internal combustion engine and a second partial power provided by the electric motor,
  a device for activating and deactivating a cylinder operable, upon the request for deactivating a cylinder that can be switched off, to cause said cylinder to be filled with fresh gas and, upon request of activating said cylinder, to cause an injection of a predetermined amount of fuel and to cause the ignition of the mixture in the temporal next suction and/or compression phase of the cylinder by no later than the end of the compression phase, and
  a device for adjusting the momentum operable to cause a multiple injection in a homogenous split mode of operation at the activation of a cylinder that was switched off.

17. A hybrid vehicle according to claim 16, wherein the electric motor and the multi-cylinder internal combustion engine are coupled to one another in a fixed manner.

18. A hybrid vehicle according to claim 16, wherein the electric motor and the multi-cylinder integral combustion engine are coupled to one another in a variable manner.

19. A method for operating a hybrid vehicle with a multi-cylinder internal combustion engine coupled to an electric motor comprising at least one inlet and at least one outlet valve per cylinder, a variable valve control, and a fuel injection device for directly injecting fuel into the cylinders, with the overall driving power provided to the vehicle being provided in a first partial power by the internal combustion engine and a second partial power by an electric motor, the method comprising the steps of:
  upon the request for deactivating a cylinder that can be switched off, filling said cylinder with fresh gas and,
  upon request, to activate the cylinder, injecting of fuel multiple times in a homogenous split mode of operation and igniting a mixture of said fuel and fresh gas in the temporally next suction or compression phase of the cylinder by no later than the end of the compression phase.

* * * * *